March 12, 1963 M. J. DI TORO 3,081,457

DECADE METHOD OF NOISE REDUCTION

Filed March 3, 1949

2 Sheets-Sheet 1

INVENTOR
MICHAEL J. DITORO
BY R P Morris
ATTORNEY

INVENTOR
MICHAEL J. DITORO
BY R. P. Morris
ATTORNEY

United States Patent Office 3,081,457
Patented Mar. 12, 1963

3,081,457
DECADE METHOD OF NOISE REDUCTION

Michael J. Di Toro, Bloomfield, N.J., assignor to International Standard Electric Corporation, New York, N.Y., a corporation of Delaware Filed Mar. 3, 1949, Ser. No. 79,497
13 Claims. (Cl. 343—118)

This invention relates to the reduction of noise in communication systems; more particularly the invention deals with the reduction of noise in systems in which the message is periodic or recurrent.

In nearly all communication systems the message gathers random noise during transmisison so that the received signal contains not only the desired message but also the unwanted noise. It has been found heretofore that, in many instances, the noise is so great that it obliterates the signal or impairs its intelligibility. Since the amount of noise picked up increases with the distance over which the message is transmitted the noise limits the effective range of the communication system. Another deleterious effect of noise is found in direction finders. If the direction finder is of the null type, that is if the bearing is indicated by a minimum signal, false bearings may be obtained because the random noise may make the signal greater at the true bearing than at some other bearing. Similarly in direction finders in which the bearing is determined by a maximum signal the noise may cause the maximum to be greatest at an angle other than the true bearing.

My invention provides a system and method whereby the message to noise ratio can be greatly increased. The invention is particularly applicable to that large number of communication systems in which the message recurs many times with little or no modification. In such systems the waveform for adjacent periods of the message is almost alike and changes only when a large number of periods have passed. Direction finders are one example of communication systems of the kind in which the message does not change appreciably. This is especially true for messages received from great distances and such messages are usually those which are weak and need noise elimination. For example a radio transmitter in a very distant airplane would give substantially the same bearing during a considerable period of time.

The process by which my invention selectively passes a periodic message and attenuates the accompanying noise may be explained as follows: Given the signal $s(t)$ composed of a message $m(t)$ and a random noise $n(t)$ so that $s=m+n$. Inasmuch as the message is periodic, with a peridicity T, then $m(t)=m(t+kT)$, where $k$ is an integer. Because the noise is random one seldom has the condition where $n(t)$ equals $n(t+kT)$. Thus by delaying (or storing) the signal $s(t)$ for a time T equal to one period, thus obtaining $s(t-T)$, one can get a combined signal comprising the new signal $s(t)$ and the stored signal $s(t-T)$, i.e.

$$s(t)+s(t-T)=2m(t)+n_2(t)$$

where $$n_2(t)=n(t)+n(t-T)$$

It is seen that this has doubled the message amplitude and that the noise has increased, but has not doubled. This is so because the message has been added in phase, while the noise has been added in random phase. Obviously, the more such in-phase additions of the message and random-phase additions of the noise one obtains, the better will be the message to noise ratio. It will be shown later in the specification that when $n$ periods of the message are superimposed the voltage ratio of message to noise increases as $\sqrt{n}$.

It is accordingly an object of my invention to provide a method of and means for increasing the ratio of message to noise by superimposing a large number of signals each carrying substantially the same message.

It is another object of this invention to provide a method of and means for superimposing a large number of signals with a minimum of apparatus.

It is a further object of this invention to increase the accuracy of a direction finder.

It is still another object of this invention to provide a decade system for superimposing a large number of periodically received signals so as to increase the message to noise ratio.

Another object of my invention is to provide a method of and a system for efficiently storing or delaying periodically received signals and then deriving the sum of the stored or delays signals so as to increase the message/nosie ratio.

With these and other objects in view, which will appear more clearly from the following description and accompanying drawing, the present invention provides a method of and means for increasing the message to noise ratio of a sequence of signals containing substantially the same message as well as random noise, which method comprises the steps of storing successive signals and integrating a group of stored signals into a single signal of higher order, the latter type having an improved message to noise ratio. Preferably, a series of higher-order signals thus obtained are again stored and integrated into a single signal of a still higher order, and so forth, until the desired increase in signal to noise ratio is obtained.

In the following, the term "decade" is used to denote the various groups of original and higher-order signals in view of the analogy between these groups and the digits of the decimal system; it is to be understood, however, that each "decade" may be comprised of any number, not necessarily ten, of signals of a particular order.

The invention also provides an arrangement for carrying the above method into practice comprising a plurality of signal storing means, signal responsive means adapted to impress successive signals upon respective ones of said storing means, and integrating means for simultaneously detecting said impressed signals and combining them into a signal of higher order. In a particular embodiment, the signal responsive means and the storing means may form part of an electromagnetic recorder.

If in a communication system the received message does not change over a large period of time a large number of received signals each containing the message may be obtained and superimposed in order to obtain the best value $m$ of the true message $m_t$. This is so because the message is superimposed in the same polarity and with the same amplitude while the noise is superimposed with random polarity and a normal distribution of amplitude. In the long run therefore the message becomes much greater than the noise. This may be demonstrated as follows: Consider the measurement of some physical quantity where random errors may occur (and where systematic errors are assumed to have been eliminated by suitable zero adjustments of the measuring instruments). If $n$ measurements are made of, say, the bearing, giving equally reliable values $x_1, x_2, \ldots x_n$ for the measured quantity, the most probable value $\bar{x}$ is the arithmetic mean $$\bar{x}=\frac{1}{n}(x_1+x_2+\ \ldots\ x_n) \qquad (1)$$

A measure of how close this $\bar{x}$ is to the true (but unknown) value $x_t$ is obtained by computing $$S_{\bar{x}}=S_d/\sqrt{n} \qquad (2)$$

Here $S_{\bar{x}}$ is the standard deviation of $\bar{x}$, while $S_d$ is the standard deviation of the $x$'s, and is given by $$S_d^2=\frac{1}{n-1}[(x_1-\bar{x})^2+(x_2-\bar{x})^2+\ \ldots\ +(x_n-\bar{x})^2] \qquad (3)$$

For a normal law distribution of the $x$'s, the probability that the value of $\bar{x}$ differs by more than $3S_{\bar{x}}$ from $x_t$, the true value, is only 0.003.

The important fact to note is that as $n$ grows larger, $S_{\bar{x}}$ grows smaller and $\bar{x}$ becomes known more and more accurately and approaches the true value $x_t$. In order to see how this relates to the determination of a message in an electrical signal containing both the message and noise one may consider that the message is $x_t$, the signal is $x_1$, $x_2$, etc. and the noise is $(x_1-x_t)$, $(x_2-x_t)$ etc. A number of $n$ measurements are taken of the (recurrent) signal $x$, and the best value of the message $x_t$ is given by $\bar{x}$ computed according to Equation 1. The latter equation sums or integrates the signal $x$. As indicated by Equation 2, the accuracy of the derived message $\bar{x}$ improves directly as $n$ or as the square root of the time taken for obtaining the various $x$'s.

Figure 1:
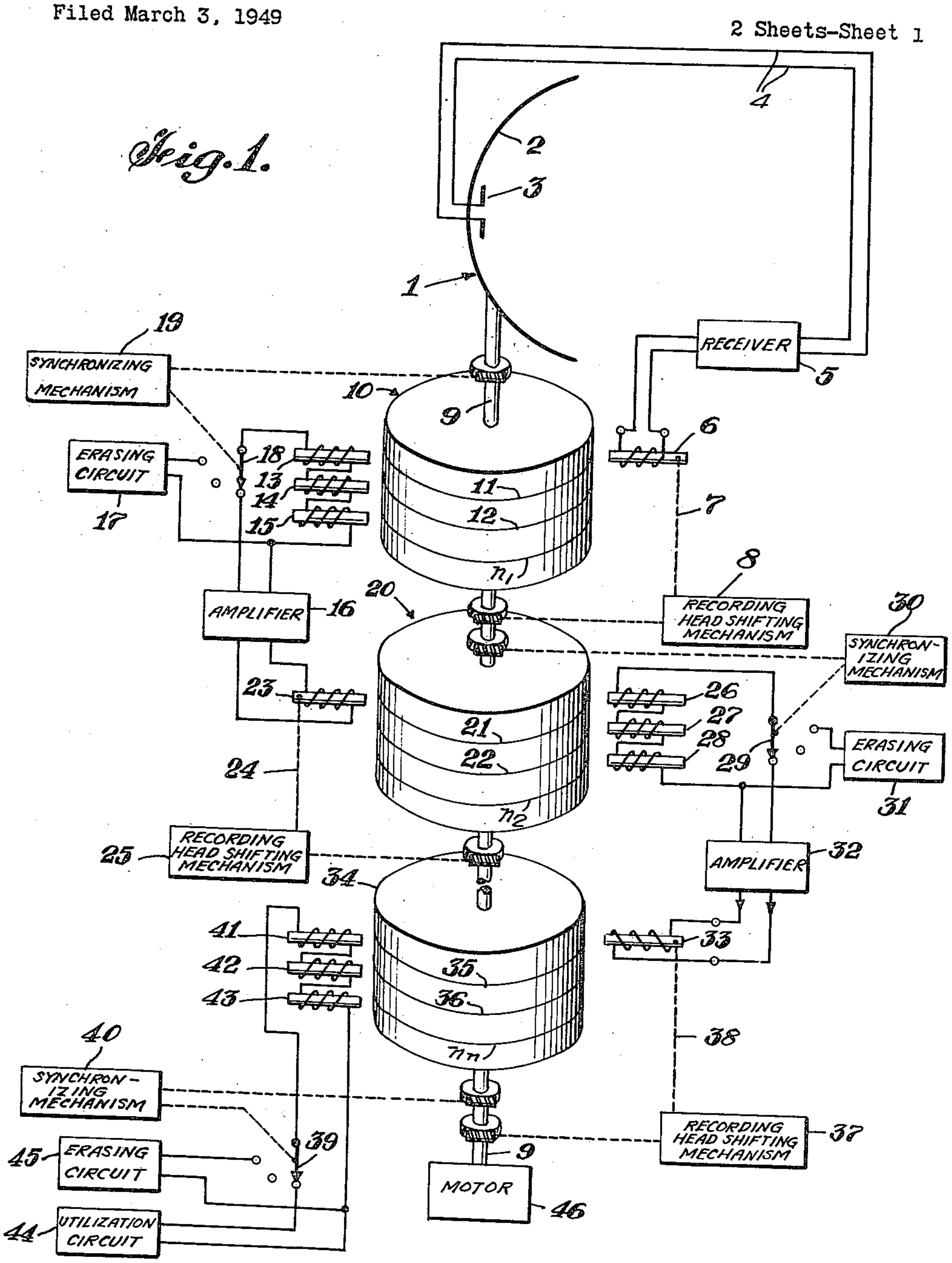
FIG. 1 is a schematic representation of one embodiment of my invention as applied to a radio direction finder.

Referring to FIG. 1 there is schematically represented a system for obtaining a large number of superpositions of a periodic signal with a minimum of equipment. In this figure there is shown a direction finder having a rotating antenna 1 consisting of a reflector 2 and a radiator or antenna 3. The antenna 3 and reflector 2 are designed so as to be highly directive. As the antenna 1 is continuously rotated by any suitable means, a message from a given direction will be received once during each revolution. Such direction finders are well known in the art and a detailed description thereof is therefore unnecessary. The antenna 3 is connected by a transmission line 4 to a radio receiver 5. The output of the receiver is fed to a magnetic recording head 6. The recording head 6 is juxtaposed to a drum 10 rotated in synchronism with the antenna 1 by virtue of a shaft 9 interconnecting the drum 10 and the antenna 1. The drum 10 is provided with a series of magnetic wire loops 11, 12, . . . $n_1$. The signals impressed on the recording head 6 during each revolution of the antenna 1 are successively recorded on the wire loops 11, 12 . . . $n_1$. This can be done by stepping the recording head down from one loop to the next at the end of each revolution of the antenna 1. The mechanism for shifting the recording head in this manner is mechanically coupled to shaft 9 and is indicated by the reference numeral 8. The recording head 6 is connected to the recording head shifting mechanism 8 by a mechanical link 7. By means of this process a decade of received bearing signals is recorded on the decade of magnetic loops 11, 12, . . . $n_1$.

The decade of recorded signals all corresponding to a given bearing or message are added together, or integrated, by the series connected reproducing heads 13, 14 and 15, there being one reproducing head for each loop. During the period of recording the switch 18 is held open by a suitable synchronizing mechanism 19, mechanically coupled to shaft 9. After a full decade of bearings have been recorded, the switch 18 is closed so that the reproducing heads are connected to the amplifier 16. The output of the amplifier 16 is impressed on recording head 23 associated with the drum 20. After the signals have been picked up by the reproducing heads 13, 14 and 15, the switch 18 is connected to the erasing circuit 17 and during the next revolution of the drum 10 the recorded signals are erased to ready the drum 10 for recording the next decade of signals. It is customary to provide separate erasing heads but for the sake of simplicity this function is herein assigned to the reproducing heads 13, 14 and 15. Since the techniques of magnetic wire recording, reproducing and erasing are well known in the art details thereof are not shown herein and it is apparent that any suitable means for effecting these operations may be utilized.

Each decade of received signals is, as we have seen, integrated and produces a single signal in the recording head 23. The recording head 23 is moved along the drum 20 in juxtaposition to the wires 21, 22 . . . $n_2$ by the recording head shifting mechanism 25 mechanically coupled to shaft 9 and having a mechanical connection 24 to the recording head 23. In this manner successive signals in the recording head 23 are impressed on the successive loops 21, 22, etc. After a full decade of signals have been impressed on the wire loops of drum 20, they are reproduced simultaneously and additively in the reproducing heads 26, 27 and 28. The switch 29 is operated by the synchronizing mechanism 30 in the same manner as is the switch 18. After the signals are reproduced and impressed on the amplifier 32, the switch 29 is connected to the erasing circuit 31 to remove the signals recorded on the drum 20, and another decade of signals are recorded thereon in the same manner.

The amplifier 32 impresses a signal on the recording head 33. This signal is the sum of the decade of signals derived from the drum 20. The recording head 33 is stepped along the drum 34 in juxtaposition to the wires 35, 36, . . . $n_n$ by the recording head shifting mechanism 37 and link 38. In this manner the recording head 33 impresses successive signals on each of the wires of the drum 34. After a full decade of signals have been impressed on these wires the switch 39 is operated by the synchronizing mechanism 40 so as to connect the reproducing heads 41, 42 and 43 to the utilization circuit 44. The switch 39 may then be connected to the erasing circuit 45 for removing the signals from the wires on the drum 34.

It is apparent that any number of such drums and their associated equipment may be provided and the break in the shaft 9 between drums 20 and 34 indicates that any number of similar drums and their associated equipment may intervene between the drums 20 and 34. The drums and antenna 1 may be driven by motor 46 as shown.

Thus, in general, if there are N drums, the first drum carrying $n_1$ loops, the second carrying $n_2$ loops, etc. and the last drum carrying $n_N$ loops, the total number of superpositions S obtainable with this scheme is $$S=n_1n_2n_3\ \ldots\ n_N \qquad (4)$$

It will be noticed that if decading were not employed the number of superpositions would have been, for the same number of reproducing heads, equal to $$n_1+n_2+\ \ldots\ +n_N$$

Figure 2:
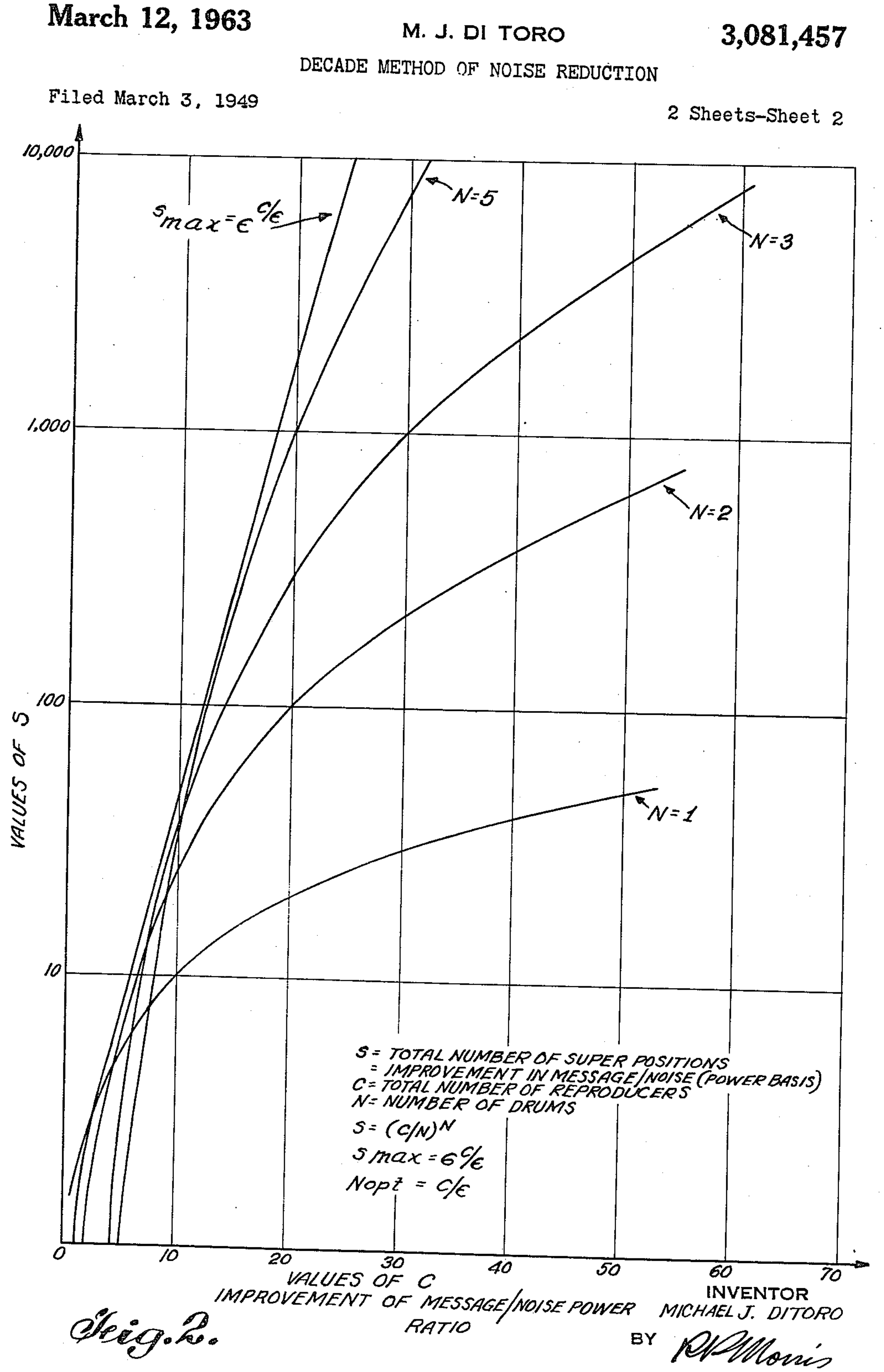
FIG. 2 is a graph showing the improvement of the message/noise power ratio for a given number of superpositions and illustrates certain design criteria which I have discovered.

The latter is much less than S of Equation 4. This scheme thus gives a very large number of superpositions of signals, with limited means, thereby effecting a large increase of message/noise in a periodic message. The extent of this increase is seen from FIG. 2 which shows the expected increase in message/noise ratio for the scheme of FIG. 1 as the number of drums is increased. FIG. 2 shows, for example, that if 20 reproducing heads were used on a single drum, i.e. $N=1$, only 20 superpositions would be obtained; but if $N=2$, i.e. two drums, 100 superpositions results; $N=3$ gives 294 superpositions; and $N=5$ gives 1024 superpositions for the same number of reproducing heads. It is evident that a decade system such as I have shown in FIG. 1 gives a tremendous increase in the number of superpositions and a corresponding increase in the message/noise ratio. It can be shown that, for a given number C of reproducers, the maximum value of S, $S_{max}$, is obtained when:

$$n_1 = n_2 = \ldots = n_N$$

and $$N_o = \frac{C}{E}$$

where $C = n_1 + n_2 + \ldots + n_N$ and $E = 2.718$, the natural Napierian base, $N_0$ being the optimum number of drums or groups of reproducers.

In FIG. 1, I have schematically shown magnetic wire recorders for storing and integrating the signals. It is evident, however, that any other of the many well known devices and circuits capable of integrating, storing, or delaying recurrent signals may be used. The best type of integrating circuit or device for a specific application will depend on such considerations as the nature of the signals, the periodicity of the signals, space limitations and cost. My invention is, therefore, not limited to magnetic recorders. Also, my invention is applicable to any type of system, not necessarily electrical, in which a periodic signal is accompanied by noise. It should be noted that the improved signal is available even before the last drum is reached. Thus, in the case of direction finding a quick bearing is desired, an earlier drum may be used, at the expense, of course, of accuracy. Thus the accuracy is adjustable so that if one can wait a long time for the answer, then the accuracy is improved. How long one can wait depends on how fast the message changes. Although a specific embodiment of my invention has been shown and described it is not intended to be limited thereby but it is intended to cover the invention broadly within the spirit and scope of the appended claims.

What is claimed is:

1. The method of increasing the message to noise ratio of a sequence of successively occurring signals containing substantially the same message as well as random noise which comprises the steps of integrating in phase groups of said signals and deriving a composite signal from each group of signals and integrating in phase a group of the composite signals into one final signal.

2. The method of increasing the message to noise ratio of a sequence of successively occurring signals containing substantially the same message as well as random noise which comprises the steps of storing successive signals, integrating in phase a group of stored signals into a single signal of higher order, the latter having an improved message to noise ratio, storing a series of higher-order signals thus obtained, integrating in phase a group of stored higher-order signals into a single signal of still higher order, and so forth until the desired increase in signal to noise ratio is obtained.

3. In a communication system for recurrent signals which consist of a message and undesired noise, a receiver for said signals including a plurality of devices each having an input circuit and an output circuit connecting said devices in cascade, each of said devices having integrating means for converting a decade of successive signals and accompanying noise impressed on its input circuit into a single signal in its output circuit proportional to the in phase sum of the said sequence of signals and the random phase of said noise, and a utilization means connected to the output circuit of the last of the said devices, whereby the message to noise ratio is increased.

4. In a communication system for recurrent signals containing a message and undesired noise, a receiver for said signals including a plurality of devices each having an input circuit and an output circuit connecting said devices in cascade, each of said devices having integrating means for converting a sequence of said signals and accompanying noise impressed on its input circuit into a single signal in its output circuit proportional to the in phase sum of the said sequence of signals and the random phase of said noise, and a utilization means connected to the output circuit of the last of said devices, whereby the message to noise ratio is increased.

5. In a communication system, in combination, a receiver for incoming electrical signals which are periodic and which consist of a message and electrical noise, first signal responsive means for storing successive decades of said signals and then reproducing each stored decade of signals simultaneously and additively to thereby obtain a second order signal proportional to the sum of the decade of signals, second signal responsive means for storing a decade of said second order signals and then reproducing the decade of second order signals simultaneously and additively to obtain a third order signal proportional to the sum of the decade of second order signals, and means for utilizing the third order signal, whereby the third signal responsive order signal has a much higher message to noise ratio than the incoming electrical signals.

6. In a communication system, in combination, a receiver for incoming electrical signals which are periodic and which consist of a message and electrical noise, first magnetic recording and reproducing means for recording successive decades of said signals and then reproducing each stored decade of signals simultaneously and additively to thereby obtain a second order signal proportional to the sum of the decade of signals, second magnetic recording and reproducing means for recording a decade of said second order signals and then reproducing the decade of second order signals simultaneously and additively to obtain a third order signal proportional to the sum of the decade of second order signals, and signal responsive means for utilizing the third order signal, whereby the third order signal has a much higher message to noise ratio than the incoming electrical signals.

7. In a communication system, in combination, a receiver for incoming electrical signals which are periodic and which consist of a message and electrical noise, first magnetic recording and reproducing means for recording successive decades of said signals and then reproducing each stored decade of signals simultaneously and additively to thereby obtain a second order signal proportional to the sum of the decade of signals, second magnetic recording and reproducing means for recording successive decades of said second order signals and then reproducing each stored second order decade of second order signals simultaneously and additively to obtain a third order signal proportional to the sum of the decade of second order signals, third magnetic recording and reproducing means for recording a decade of said third order signals and then reproducing the decade of third order signals to obtain a fourth order signal which is proportional to the sum of the decade of third order signals, and signal responsive means for utilizing the fourth order signal, whereby the fourth order signal has a much higher message to noise ratio than the incoming electrical signals.

8. In a direction finder having means for obtaining recurrent bearing signals which consist of the bearing information and undesired noise, a receiver for said signals including a plurality of devices connected in tandem, each of said devices having integrating means for converting a sequence of signals impressed thereon into a single signal proportional to the in phase sum of the said sequence of signals and the random phase of said noise, and utilization means connected to the last of the said devices, whereby the bearing error due to noise is reduced.

9. A radio direction finder comprising an antenna, a receiver connected to the antenna, detector means connected to the receiver for obtaining a succession of bearing signals from a given radio message, first circuit means for integrating in phase the bearing signals in decades for deriving composite signals each proportional to the in phase sum of a decade of the bearing signals, and second circuit means for integrating in phase a decade of the composite signals to obtain a final signal, whereby the bearing error of the final signal due to noise is reduced.

10. A radio direction finder comprising a rotating directional antenna, a receiver connected to the antenna, mechanism for continuously rotating the antenna so that a radio signal from a given direction is received at least once during each revolution of the antenna, first circuit means for integrating in phase decades of the signals received from a given direction during successive revolutions of the antenna for deriving composite signals each proportional to the in phase sum of a decade of the received signals, and second circuit means for integrating in phase a decade of the composite signals to obtain a final signal, whereby the bearing error of the final signal due to noise is reduced.

11. A radio direction finder comprising a rotating directional antenna, a receiver connected to the antenna, mechanism for continuously rotating the antenna so that a radio signal from a given direction is received at least once during each revolution of the antenna, recording means for storing the signals received from a given direction during successive revolutions of the antenna, first integrating means for deriving composite signals each proportional to the sum of a decade of the stored signals, and second integrating means for deriving a final signal proportional to the sum of the composite signals, whereby the bearing error of the final signal due to noise is reduced.

12. The method of improving the signal to noise ratio of substantially constant, periodic signals comprising successively integrating a series of said periodic signals occurring over a given period to derive a group of first integrated signals, simultaneously integrating in phase said group of said first integrated signals to derive a first composite signal, successively integrating another series of said periodic signals occurring over a second period to derive a group of second integrated signals, simultaneously integrating in phase said group of said second integrated signals to derive a second composite signal, and simultaneously integrating said first and second composite signals to derive a further composite signal.

13. A method according to claim 12, further comprising deriving other further composite signals from still other periodic signals by the method described, and simultaneously integrating all said further composite signals to derive a final composite signal.

References Cited in the file of this patent

UNITED STATES PATENTS

| | | |
|---|---|---|
| 752,858 | Pedersen | Feb. 23, 1904 |
| 768,541 | Ries | Aug. 23, 1904 |
| 873,042 | Hagemann | Dec. 10, 1907 |
| 873,541 | Hagemann | Dec. 10, 1907 |
| 1,315,539 | Carson | Sept. 9, 1919 |
| 2,099,536 | Scherbatskoy | Nov. 16, 1937 |
| 2,261,321 | Williams | Nov. 4, 1941 |
| 2,406,406 | Sandretto | Aug. 27, 1946 |
| 2,422,295 | Eaton | June 17, 1947 |
| 2,427,421 | Rieber | Sept. 16, 1947 |
| 2,430,038 | Wertz | Nov. 4, 1947 |
| 2,430,283 | Epstein | Nov. 4, 1947 |
| 2,430,307 | Smith | Nov. 4, 1947 |
| 2,474,628 | Hurvitz | June 28, 1949 |
| 2,487,995 | Tucker | Nov. 15, 1949 |
| 2,524,837 | Russell et al. | Oct. 10, 1950 |